F. A. MONROE, Jr.
TREATMENT OF CERTAIN LIQUORS.
APPLICATION FILED MAR. 8, 1916.
1,236,097.
Patented Aug. 7, 1917.
2 SHEETS—SHEET 1.
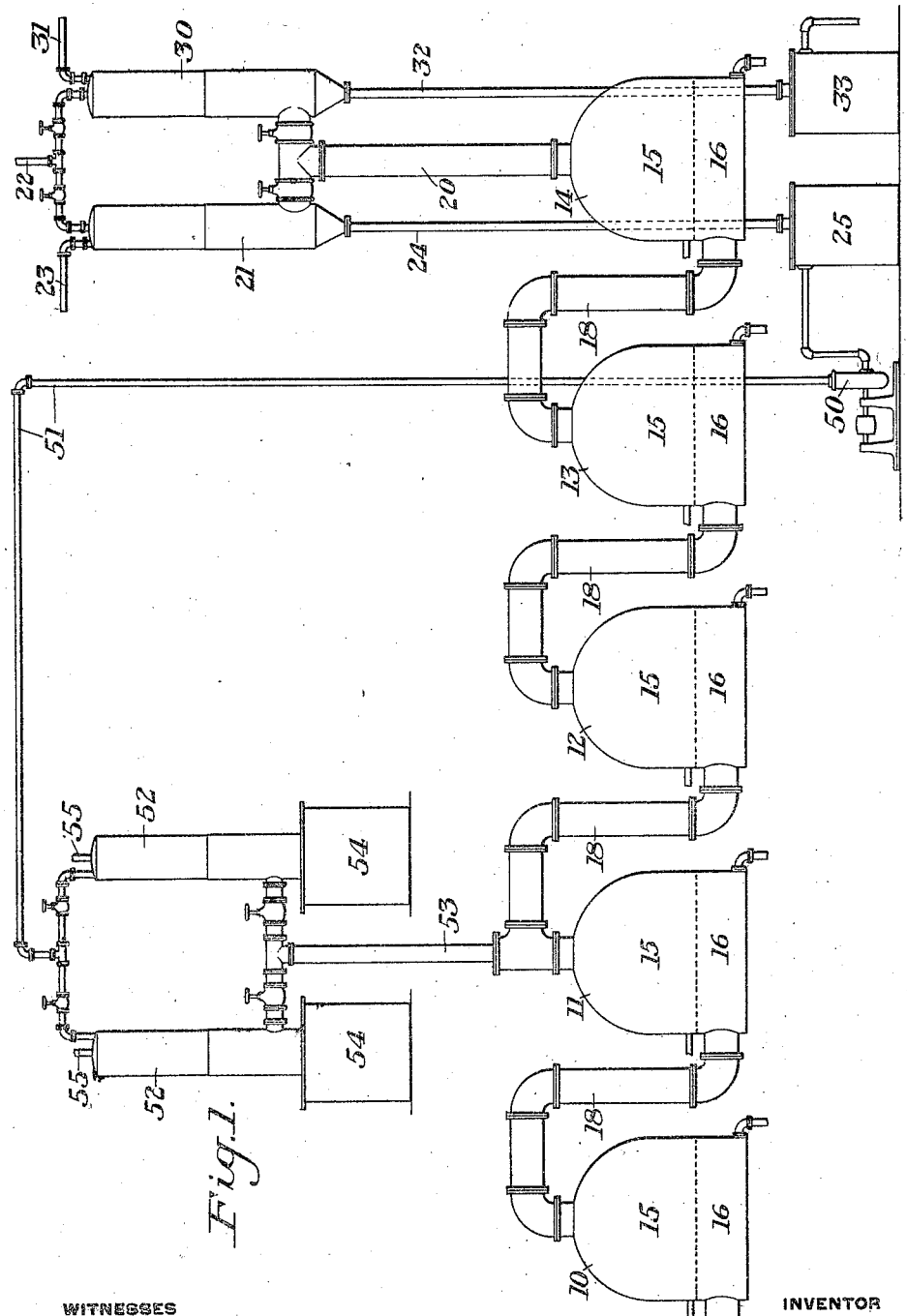

F. A. MONROE, Jr.
TREATMENT OF CERTAIN LIQUORS.
APPLICATION FILED MAR. 8, 1916.
1,236,097.
Patented Aug. 7, 1917.
2 SHEETS—SHEET 2.
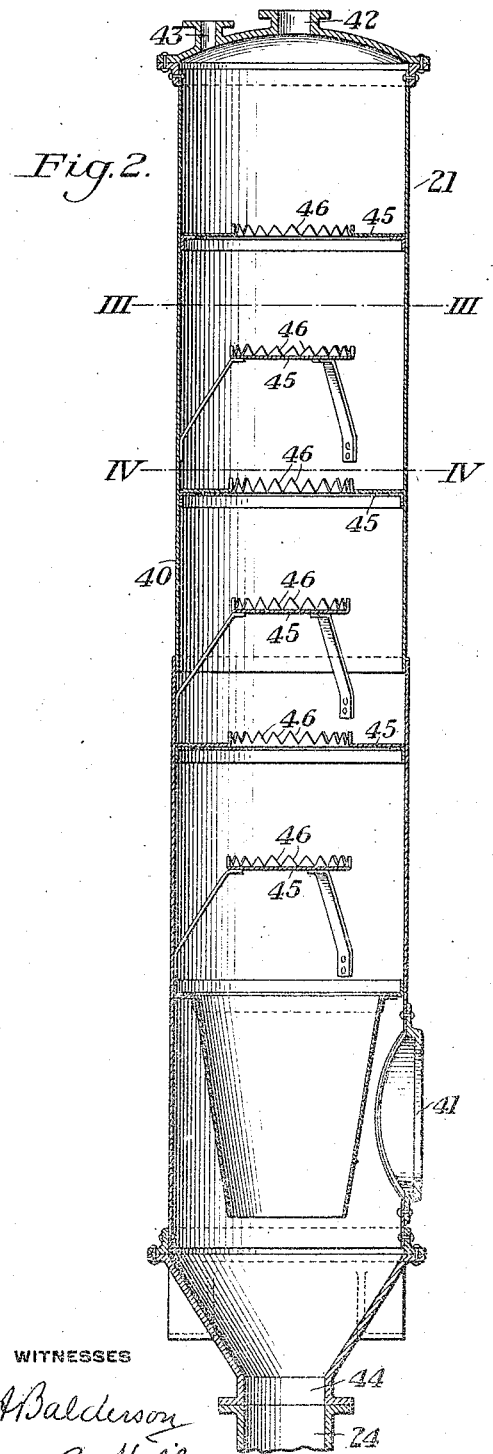
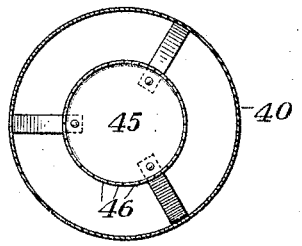
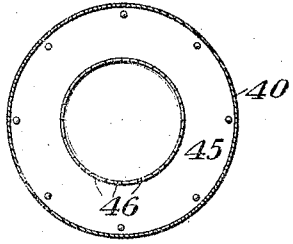
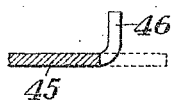
WITNESSES
INVENTOR

UNITED STATES PATENT OFFICE.

FRANK A. MONROE, JR., OF CLEVELAND, OHIO, ASSIGNOR TO THE DYER COMPANY, OF CLEVELAND, OHIO, A CORPORATION OF OHIO.

TREATMENT OF CERTAIN LIQUORS.

1,236,097. Specification of Letters Patent. Patented Aug. 7, 1917.

Application filed March 8, 1916. Serial No. 82,963.

*To all whom it may concern:*

Be it known that I, FRANK A. MONROE, Jr., a citizen of the United States, residing at Cleveland, Cuyahoga county, Ohio, have invented a new and useful Improvement in the Treatment of Certain Liquors, of which the following is a full, clear, and exact description, reference being had to the accompanying drawings, forming part of this specification, in which—

Figure 1 is a diagrammatic elevation of the preferred embodiment of the apparatus.

Fig. 2 is a vertical section through the heater.

Fig. 3 is a section on the line III—III of Fig. 2.

Fig. 4 is a section on the line IV—IV of Fig. 2, and

Fig. 5 is a detail view.

The present invention relates to the treatment of liquors which produce a fouling deposit on heating, and particularly to the treatment of the liquor known in the sugar industry as cold saccharate waste water to recover hot saccharate therefrom.

While my invention has other applications and may be used in other industries, it will be explained with particular reference to the sugar manufacturing industry.

Impure sugar solutions, and particularly molasses, contain sugar which is usually recovered by a desugarizing process in which powdered lime or calcium oxid is used to effect the proper chemical reactions for the separation and subsequent recovery of the sugar. The lime combines with the sugar to form what are known as saccharates. These saccharates consist principally of what are known as cold saccharate and hot saccharate, and which are precipitated from the liquor by cooling and heating it respectively. The separation of these saccharates is usually carried out by mixing powdered caustic lime or calcium oxid with a previously diluted or refrigerated molasses or impure sugar solution. The calcium oxid unites chemically with the sugar in the solution to form, in the main, insoluble saccharates known as cold saccharate, which are filtered out from the solution leaving a clear filtrate. The most favorable temperature for this reaction is between 45 and 50 degrees Fahrenheit. The filtrate, which is known as cold saccharate waste water, however, contains saccharates known as hot saccharate which precipitate upon heating, the most complete precipitation being obtained at a temperature of about 195 degrees F.

The quantity of waste water required to be heated to recover the hot saccharate and the range of temperature through which it must be heated are such as to require a considerable expenditure of heat, thereby making the practical operation of the recovery of the hot saccharate quite expensive.

The hot saccharate precipitate formed on heating forms a fouling deposit which precludes the use of surface heaters, such as tubular heaters or heating drums, because such fouling deposit would cover the heating surfaces and prevent the heat exchange through them.

The usual practice in treating the cold saccharate waste water to recover hot saccharate therefrom, is to inject boiler steam, usually at 10 to 15 pounds gage pressure, through injectors or perforated pipes into tanks containing the waste water. This method of heating with boiler steam is expensive.

In a sugar factory there are vapors coming from the multiple effect evaporators which have a pressure near or below atmospheric pressure, which furnish a cheaper supply of heat than boiler steam, but which heretofore have been unavailable for heating the cold saccharate waste water. These vapors not only lack a sufficient pressure to force them through perforated pipes or injectors into the liquor, but the pipes required would be so large, because of the large volume of the vapors, as to be unwieldy and impracticable. Moreover, it is impracticable to use these vapors to heat the liquor by means of surface heaters such as tubular heaters or heating drums, because the hot saccharate would form a fouling or heat insulating deposit upon the heating surfaces. I have found that the hitherto unavailable low pressure vapors from the evaporators may be utilized to heat the cold saccharate waste water by injecting the waste water into the vapors and mingling them at the vapor pressure. There is no difficulty in injecting the liquor into the vapors, and the heating may be carried on in apparatus so constructed that no important part becomes so fouled as to impair its efficiency as a heater.

Referring to the illustrated embodiment of the invention. 10, 11, 12, 13 and 14 indicate the bodies or effects of a multiple effect evaporator such as is usually used for concentrating sugar solutions. The construction of these bodies or effects is well known in the art and need not be here illustrated or described in detail, it being sufficient to state that each effect consists essentially of a heated space and a heating space. The heated space, which is indicated at 15 above the dotted line, contains the sugar solution to be heated, while the heating space indicated at 16 below the dotted line contains the steam or heating vapor. Steam, either direct from the boilers or the exhaust from engines or pumps, is introduced into the heating or vapor space 16 of the first effect through the pipe 17. The heat is transferred to the liquor in the liquor or heated space 15, generating vapors at a lower temperature and pressure, which in turn pass through a vapor pipe 18 to the vapor space of the second effect; and so on down through the multiple effects. The practice has heretofore been to lead the vapors generated in the last body or effect to a condenser in which they were condensed under a high vacuum, the condensation being effected by means of the ordinary condenser using cold condenser water. In accordance with the present invention the vapors from the last effect, which usually have a temperature of around 140 degrees F. and are under a fairly high vacuum, pass through a vapor pipe 20 to a heater 21, in which the cold saccharate waste water is injected into the heated vapors. The heater 21 in connected through a pipe 22 to a vacuum pump. The cold saccharate waste water is introduced into the top of the heater through a pipe 23. The partially heated waste water and the water of condensation leave the heater 21 through a Torricellian pipe or column 24 and are discharged into a tank 25. An ordinary condenser 30 is preferably connected in parallel with the heater 21 to be utilized in case the quantity of cold saccharate waste water supplied to the heater 21 is insufficient to take care of all of the vapors coming from the evaporator. The condenser 30 is connected to the vacuum pump through the pipe 22 and is supplied with condenser water through a pipe 31, the condenser water being discharged through the usual Torricellian column 32 and waste tank 33.

The heater 21 is shown in detail in Figs. 2 to 5. The heater consists of a vertical cylindrical drum 40 having a vapor receiving opening 41 near its lower end. The vacuum pump pipe is connected to the top of the heater at 42. The cold saccharate waste water is introduced into the top of the heater at 43. The cold saccharate waste water passes downwardly through the heater, intimately mingling with the rising current of heated vapor. The heated waste water and condensed vapor are discharged at 44 at the bottom of the heater. The intimate contact of the liquid and vapor is assisted by the shelves 45, the edges of which are serrated with teeth 46 which cause the liquor to break into fine streams or sprays as it passes downward through the heater.

The cold saccharate waste water, now partially heated, is taken from the tank 25 by means of a pump 50 and delivered through a pipe 51 to the heaters 52 in which it is heated to about 195 degrees F. to cause the precipitation of the hot saccharate which is insoluble at this temperature. The heaters 52 are similar in construction to the heater 21. The heating vapor for the heaters 52 is supplied from the second body or effect of the evaporator 11 through vapor pipe 53. This vapor has a temperature of about 217 degrees F. and has a pressure slightly above atmospheric. The mixture of heated liquor and condensed water is collected in tanks 54. The hot saccharate, which is insoluble at this temperature, is separated from the solution by filtration and afterward treated to yield sugar. The tops of the heaters are preferably vented to the atmosphere at 55. Two heaters 52 are provided in parallel so that in case one needs to be cleaned it can be cut out without interrupting the continuity of operation of the apparatus. The partial heating of the cold saccharate waste water in the heater 21 causes little, if any, precipitation of the hot saccharate so that a single heater is there used. The final heating of the cold saccharate waste water in the heaters 52 raises the temperature sufficiently to cause the precipitation of the saccharate, and for this reason it is desirable to use the two heaters in parallel. However, since the heating takes place by direct contact of the vapor and liquor, the fouling of the surfaces of the heater has little, if any, effect upon its efficiency.

By treating the cold saccharate waste water in the above manner, I have been able to utilize the vapors from the evaporators or vacuum pans which have been hitherto unavailable for such purpose. By heating the cold saccharate liquor in multiple stages, using for each stage vapor at as low a temperature as possible, a great economy is effected. On account of the low initial temperature of the cold saccharate waste water, a substantial amount of the heating may be done by the vapors from the last effect of the evaporator, which would otherwise be put to no useful purpose, and for the condensation of which condenser water would have to be furnished. All the heating done in this manner represents a complete saving of heat, and in addition effects a considerable economy in the use of water for the condensers.

While the present invention has been explained with particular reference to its application to the sugar industry, it will be apparent that the invention may be otherwise employed. For example, other liquids which produce fouling deposits upon heating may be similarly treated. These fouling deposits may be carried in suspension in the liquor, or may be formed therein by heating, and may consist of precipitates, coagulates, gelatinous or other materials, which would render the liquor difficult to heat by ordinary means. The present invention is not limited to details hereinbefore described, but may be practised in various ways within the scope of the following claims.

I claim—

1. The process of recovering hot saccharate from cold saccharate waste water, which consists in injecting the waste water into the vapor from a sugar solution evaporator to precipitate the hot saccharate, and in separating the precipitated saccharate from the solution, substantially as described.

2. The process of recovering hot saccharate from cold saccharate waste water, which consists in injecting the waste water into the vapor taken under a partial vacuum from the last effect of a multiple effect sugar solution evaporator to partially heat the waste water, in thereafter injecting the partially heated waste water into the vapor coming from one of the higher temperature effects of the evaporator to heat the waste water and precipitate hot saccharate therefrom, and in separating the precipitated hot saccharate from the solution, substantially as described.

3. That step in the process of recovering hot saccharate from cold saccharate waste water, which consists in injecting the waste water into the heated vapor taken from a sugar solution evaporator at a temperature lower than that corresponding to the atmospheric boiling point, substantially as described.

4. That step in the process of recovering hot saccharate from cold saccharate waste water, which consists in injecting the waste water into a vapor at or under a pressure less than atmospheric pressure and mingling waste water and vapor at the vapor pressure, substantially as described.

5. That step in the process of manufacturing sugar, which consists in causing a heat exchange between cold saccharate waste water and the vapors coming under a partial vacuum from the last effect of a multiple effect evaporator, thereby condensing the evaporator vapors and heating the waste water, substantially as described.

6. The combination with a multiple effect sugar solution evaporator, of a cold saccharate waste water heater receiving vapors from the last effect of the evaporator, means for maintaining a partial vacuum therein, means for injecting into the heater cold saccharate waste water, said heater having provision for intimately mingling the waste water with the vapor to partially heat the waste water, a second heater receiving vapors from a previous effect of the evaporator, and means for injecting the partially heated waste water coming from the first heater into said second heater, said second heater having provision for intimately mingling the waste water with the vapor therein to heat the waste water and precipitate hot saccharate, substantially as described.

7. The combination with a multiple effect sugar solution evaporator, of a cold saccharate waste water heater receiving vapors under a partial vacuum from the last effect of the evaporator for heating the waste water to a temperature insufficient to cause a material precipitation of hot saccharate, and a second cold saccharate waste water heater receiving the partially heated waste water from the first heater and receiving vapors from a previous effect of the evaporator for heating the waste water to a temperature sufficient to precipitate hot saccharate therefrom, substantially as described.

8. That step in the process of recovering hot saccharate from cold saccharate waste water, which consists in injecting the waste water into vapors obtained from any body or effect of a multiple effect sugar solution evaporator, in which the vapors are at a pressure equal to or higher than atmospheric pressure, and mingling the waste water and vapors at the vapor pressure; substantially as described.

9. The process of recovering hot saccharate from cold saccharate waste water, which consists in heating the cold saccharate waste water in a plurality of stages, and in which the progress of heating in the first stage is arrested when the temperature of the waste water is yet lower than that at which precipitation of the hot saccharate chiefly occurs; substantially as described.

10. The process of heating cold saccharate waste water, which consists in passing the waste water through a series of injection heaters working under successively lower vacuums and at successively higher temperatures, and supplying said heaters with vapors from the successive bodies or effects of a multiple effect sugar solution evaporator; substantially as described.

In testimony whereof, I have hereunto set my hand.

FRANK A. MONROE, Jr.

Witness:
JOHN FREDRICK TADDIKEN, Jr.